Patented Oct. 14, 1941

2,258,607

UNITED STATES PATENT OFFICE 2,258,607

VOLTAGE REGULATOR

William Christian Grabau, San Francisco, Calif., assignor, by mesne assignments, to Submarine Signal Company, Boston, Mass., a corporation of Maine Application October 8, 1938, Serial No. 234,067

2 Claims. (Cl. 171—314)

This invention relates to automatic voltage regulators for generators.

It is necessary in many cases to maintain a steady voltage in the line in spite of variable load which may increase or decrease, suddenly or gradually. As an example may be taken an electric system of a ship, wherein a generator is connected to a storage battery for charging purposes, and the system includes electric motors, lighting system, radio, etc. It is obvious that when motors, lights, radio and other appliances are on, a great amount of current is required to satisfy all the needs, and unless the generator increases its output, there will be a drop in voltage in the line. A switching off of the motors, lights, etc., may cut consumption of energy to a minimum and therefore the voltage in the lines may so increase that the remaining lights will be burned out, and the battery will be charged under the higher voltage than it is desirable.

Also, in charging a storage battery it is most advantageous to provide a maximum current when the battery is low, and as the battery charge and resistance increases, current should be gradually decreased. This method may be successfully pursued if the voltage of the charging generator is maintained at a constant value. The latter condition is hard to comply with as the load upon a generator is ordinarily varied by switching on and off of the motors and lights.

Furthermore, with the increase of the battery charge, there is a tendency, for the generator, particularly in shunt wound generators to raise the voltage output, and the increased voltage results in overcharging which unduly heats the battery and thereby considerably shortens its life.

The purpose of this invention is to provide an electric device which automatically and instantaneously adjusts the voltage output of a generator and maintains said voltage at any predetermined value during all changes and variations of the generator speed and of the load conditions.

Another purpose of this invention is to provide a device of the type described which employs no mechanical parts or movements and makes use of but a few small vacuum amplifying tubes such as are used in radio receivers.

Another purpose of this invention is to provide a device of the type described which is simple in construction, durable, has a wide range of application, inexpensive to manufacture and maintain, and is efficient for the purpose intended.

Other objects and advantages will appear as the specification proceeds and the novel features of the device will be particularly pointed out in the appended claims.

My invention is illustrated in the accompanying drawing in which

Fig. 1 is a wiring diagram of my device.

Fig. 2 is a wiring diagram showing an application of my device to an open circuit.

Fig. 3 is a wiring diagram of a modified portion of my device showing a different method of connecting of a resistor.

It is a well known principle that the voltage output of a generator depends upon, and therefore may be regulated by, current passing through the generator field. I employ a separate exciter for the generator field and by regulating the output of the exciter by means of a device which constitutes the subject matter of this application, I control the voltage output of the generator.

The voltage regulating device proper includes a vacuum amplifying tube so connected with the power lines that whenever the voltage in said lines varies, the bias voltage on the grid of said tube is varied also, thus changing the value or the amount of current passing through the tube. The device also includes a second vacuum amplifying tube, the grid of which is so connected with the plate of the first tube that whenever the flow of plate current in the first tube is restricted, the passage of current through the second tube is proportionally increased. As the plate of the second tube is connected with the exciter field, the flow of the current in the latter is thus regulated by the amount of current passing through said second tube, and, as has been previously explained, by the variation of voltage in the power lines.

For the purpose of illustration the detailed description of my device shall be made as applied to a generator charging a battery. But it must be understood at this time, that my device may be used to control the voltage output of a generator, whether the latter is connected to a battery or not.

In detail, I make use of a generator 1, which is connected, by means of power lines 11 and 12, to a storage battery 2, for the purpose of charging the same, and of a separate exciter 3, for said generator, both of which may be operated by any means. As shown in the Figure 1, the positive pole of the battery 2 is connected by a wire 4 with a generator field 5 and by a wire 6 with the armature of the exciter 3. Wires 7, 8 and 9 connect the generator field 5 and the exciter armature with the exciter field 10.

The increases or decrease of flow of current in the exciter field 10 will accordingly increase or decrease the voltage output of the generator 1. A relay 13 is interposed between the generator 1 and the battery 2 and is adapted to close a switch associated with said relay, when the generator builds up sufficient voltage and thereafter the current is directed to charge the battery 2.

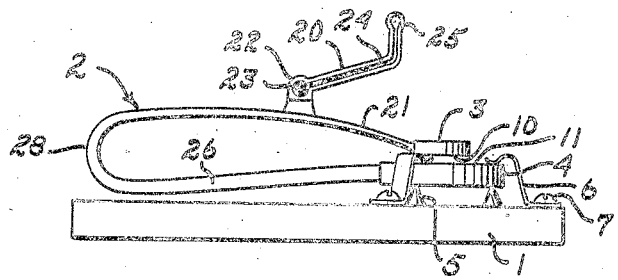

A voltage regulator proper, which is generally indicated by a numeral 15, comprises a battery